(12) United States Patent
Koyanagi

(10) Patent No.: US 6,263,417 B1
(45) Date of Patent: Jul. 17, 2001

(54) METHOD OF IMPLEMENTING VECTOR OPERATION USING A PROCESSOR CHIP WHICH IS PROVIDED WITH A VECTOR UNIT

(75) Inventor: Hisao Koyanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/182,216

(22) Filed: Oct. 30, 1998

(51) Int. Cl.$^7$ ..................................................... G06F 15/00
(52) U.S. Cl. ................................................. 712/34; 712/2
(58) Field of Search ...................................... 712/1–9, 34

(56) References Cited

U.S. PATENT DOCUMENTS 4,128,880 * 12/1978 Cray, Jr. ................................. 364/200
5,625,834 * 4/1997 Nishikawa ............................. 395/800

* cited by examiner

Primary Examiner—John A. Follansbee
(74) Attorney, Agent, or Firm—Foley & Lardner

(57) ABSTRACT

In order to implement vector operation at a higher rate, a processor chip, which is provided with a vector unit in addition to a scalar unit, is prepared. A vector operation mode is first determined, among first and second modes, via which the vector operation is implemented under control of the processor chip. The determination of the vector operation mode is carried out in said process chip. Thereafter, the vector operation is implemented using the vector unit provided in the processor chip if the vector operation mode is the first mode. On the other hand, the vector operation is implemented using a vector unit, which is provided outside the processor chip, if the vector operation mode is the second mode.

17 Claims, 5 Drawing Sheets

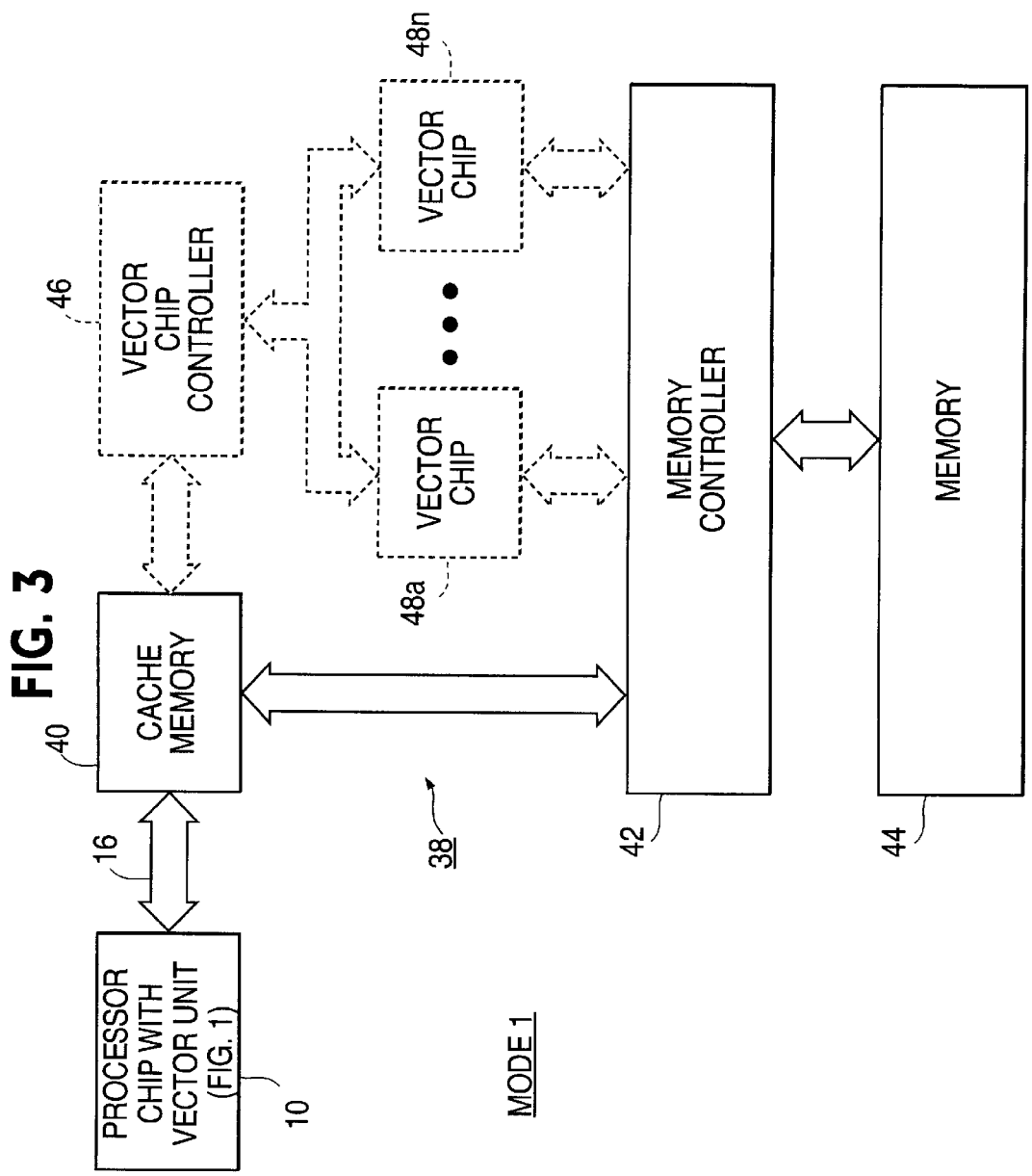

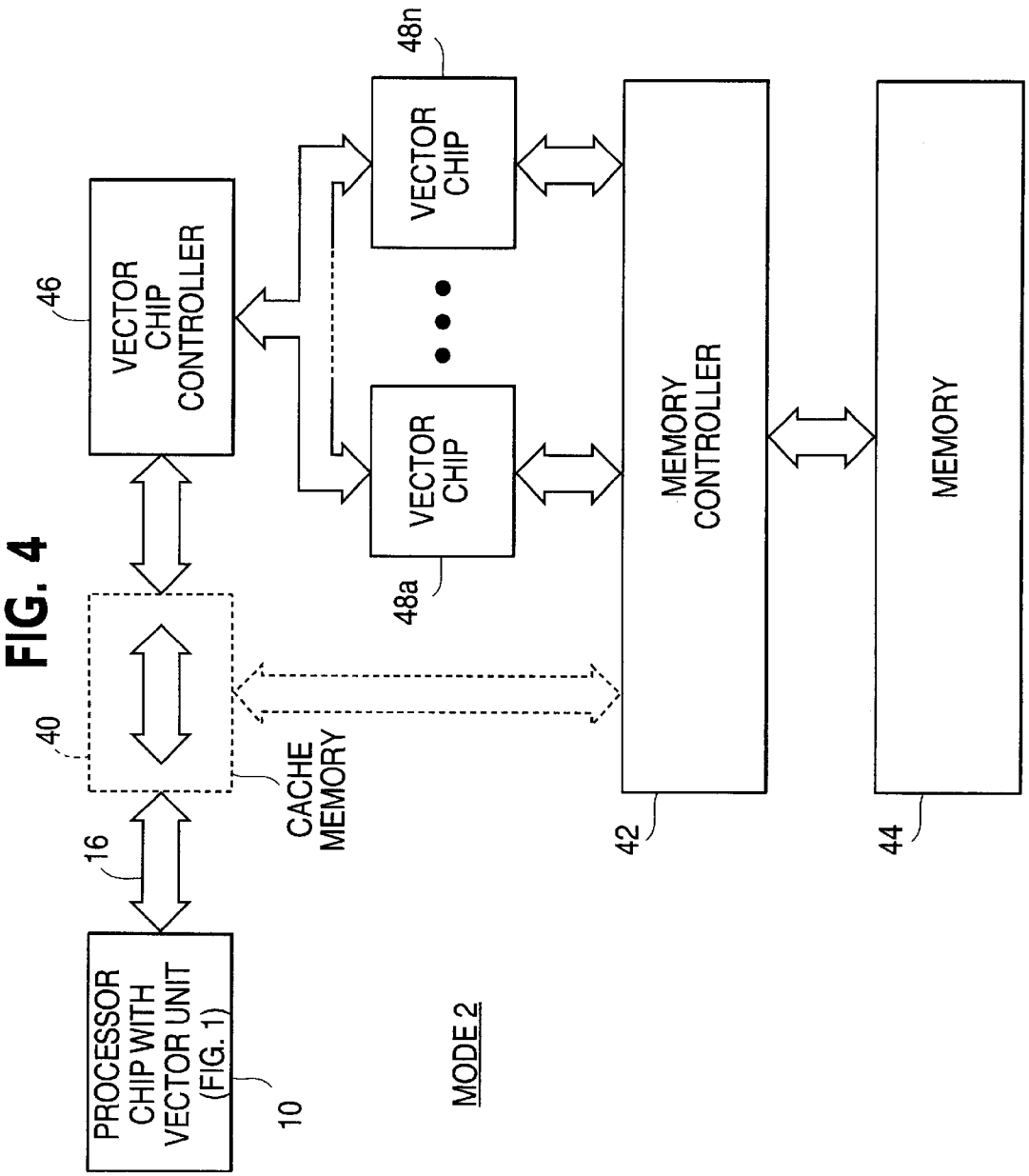

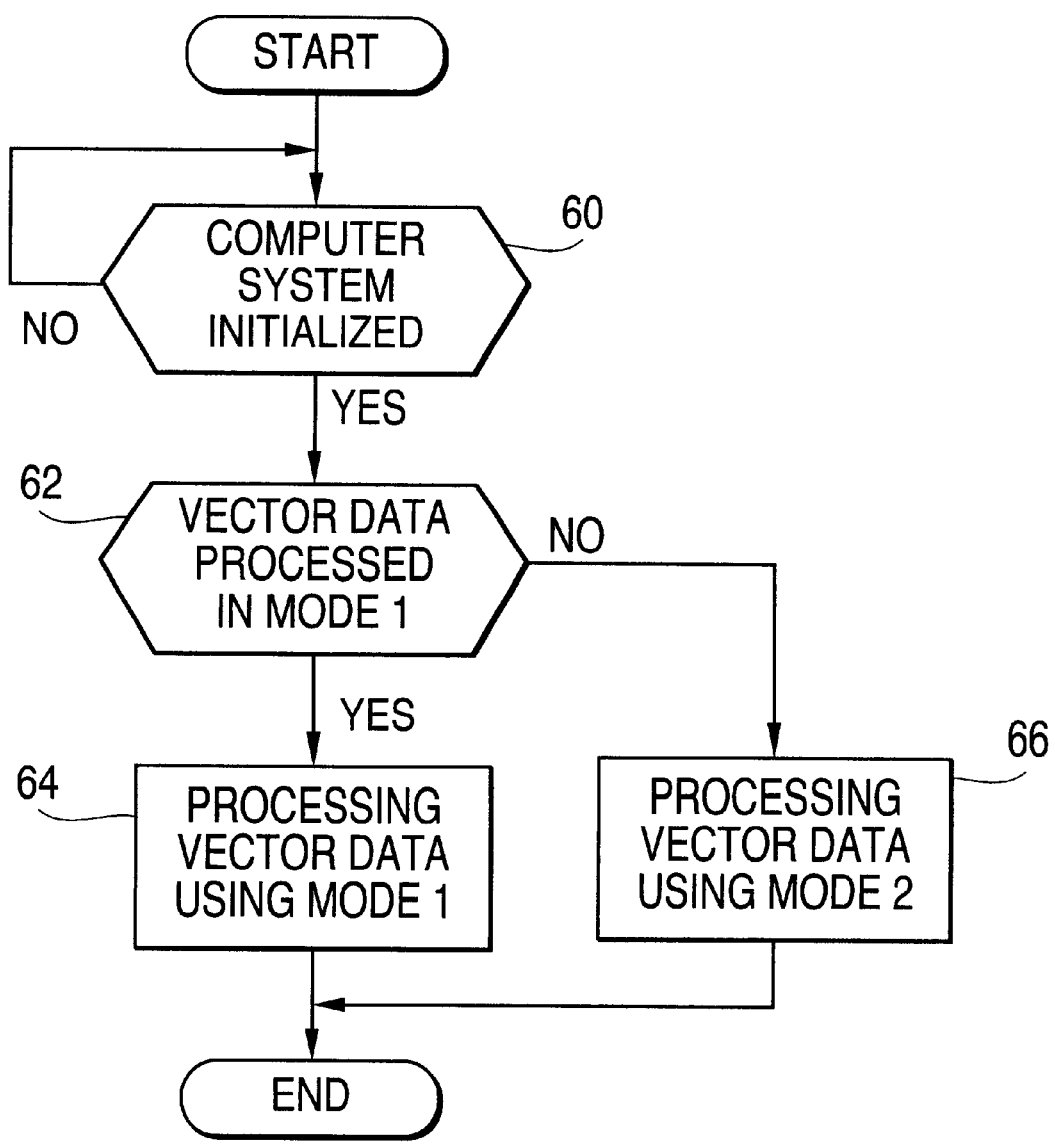

METHOD OF IMPLEMENTING VECTOR OPERATION USING A PROCESSOR CHIP WHICH IS PROVIDED WITH A VECTOR UNIT

BACKGROUND OF THE INVENTION

1. Field of the Invention

The present invention relates generally to techniques for effectively implementing vector operation using a processor chip that is provided with a vector unit, and more specifically to a method of implementing vector operation either within the processor chip or outside this chip depending on vector lengths.

2. Description of the Related Art

When a computer application requires a very large amount of computation to be completed in a reasonable time duration, so-called supercomputers are used. Such computers are needed to handle vectors of data as efficiently as possible. As is known, a vector is a linear array of numbers (elements).

In view of markedly increasing efficiency of vector computation, it is highly desirable to provide a vector unit in addition to a scalar unit on the same processor chip. However, it is not practical to provide the scalar and vector units on the same chip due to a very limited space. Therefore, when the vector data is to be implemented, the processor chip accesses a vector unit provided outside the chip. However, when the vector data, all of which have small vector lengths, are to be processed, it is not desirable to use the vector unit which is provided outside of the processor chip.

SUMMARY OF THE INVENTION

It is therefore an object of the present to provide a method of implementing vector operation using a processor chip which is provided with a vector unit.

In brief, the object is achieved by improved techniques wherein in order to implement vector operation at a higher rate, a processor chip, which is provided with a vector unit in addition to a scalar unit, is prepared. A vector operation mode is first determined, among first and second modes, via which the vector operation is implemented under control of the processor chip. The determination of the vector operation mode is carried out in said processor chip. Thereafter, the vector operation is implemented using the vector unit provided in the processor chip if the vector operation mode is the first mode. On the other hand, the vector operation is implemented using a vector unit, which is provided outside the processor chip, if the vector operation mode is the second mode.

One aspect of the present invention resides in a method of implementing vector operation using a processor chip which is provided with a vector unit, comprising the steps of: determining a vector operation mode, among first and second modes, via which the vector operation is implemented under control of said processor chip, said determination of the vector operation mode being carried out in said processor chip; implementing the vector operation using said vector unit provided in said processor chip if said vector operation mode is the first mode; and implementing the vector operation using a vector unit provided outside said processor chip if said vector operation mode is the second mode.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 3 is a block diagram schematically showing one operation mode of the present invention;

FIG. 4 is a block diagram schematically showing another operation mode of the present invention; and FIG. 5 is a flow chart which includes steps which characterize the present invention.

DETAILED DESCRIPTION OF THE PREFERRED EMBODIMENTS

In accordance with the present invention, vector data operation is implemented either within a processor chip itself or outside of this chip depending on a content of a vector operation indicator that is provided in the processor chip. The vector operation within the processor chip per se is referred to as Mode 1 while the vector operation outside the processor chip is called Mode 2. The content of the indicator may usually be set at the time when the computer system is initialized. As an alternative, by way of example, the content of the indicator may be changed before a new program is executed.

Mode 1 is selected when all or most of vector data have vector lengths each of which is less than 32 (for example). On the other hand, Mode 2 is selected when all or most of vector data have vector lengths each of which is within 256 (for example). The selection of modes will be described in more detail later.

Figure 1:
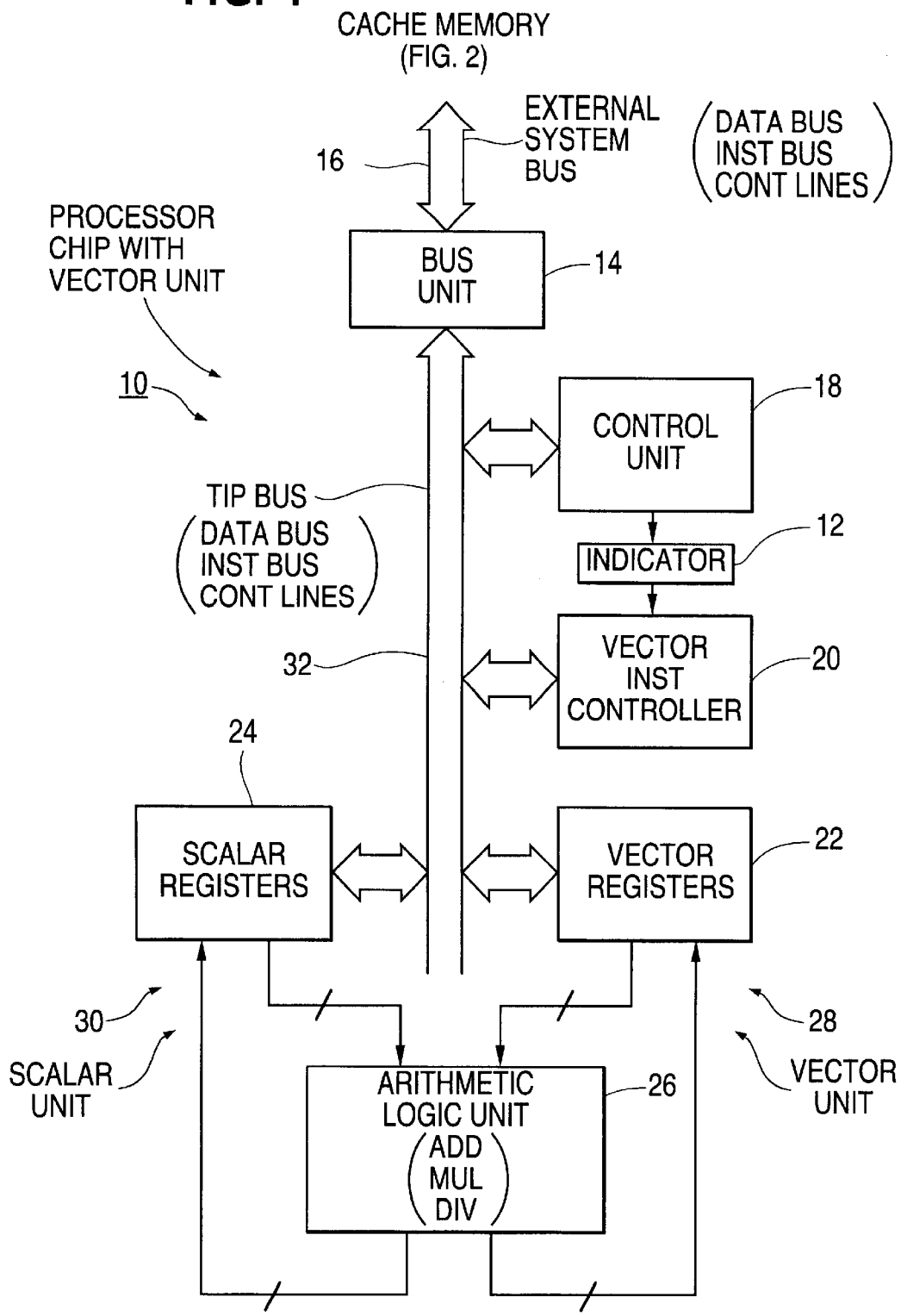
FIG. 1 is a diagram schematically showing, in block diagram form, a plurality of functional blocks of a processor chip to which the present invention is applicable.

Referring to FIG. 1, a processor chip 10 to which the present invention is applicable is schematically illustrated in block diagram form. The above-mentioned indicator, which is denoted by reference numeral 12 in FIG. 1, is provided in the processor chip 10.

As shown in FIG. 1, the chip 10 comprises a bus unit (or bus interface unit) 14 for interconnecting the chip 10 with external circuits via an external system bus 16 which includes a data bus, an instruction bus, and control lines, as is well known in the art. The chip 10 further comprises a control unit 18, a vector instruction controller 20, vector registers 22, scalar registers 24, and an arithmetic logic unit (ALU) 26. As illustrated, most of the aforesaid blocks are interconnected with each other via a tip bus 32 which, as in the external system bus 16, includes a data bus, an instruction bus, and control lines.

The vector registers 22 and the ALU 26 comprise in combination a vector unit 28, and similarly, the scalar registers 24 are combined with the ALU 26 and forms a scalar unit 30. That is, the two units 28 and 30 share the ALU 26 which implements logic operations of addition, multiplication, division, etc. However, it is within the scope of the present invention to provide two ALUs which are respectively dedicated to the vector unit 28 and the scalar unit 30.

It is assumed that an executable program, which has been translated or compiled into a machine code form that a processor can execute, is stored in a suitable external storage such as a hard disk in a computer system in question. Further assuming that the executable program includes a piece of mode information that indicates Mode 1 or Mode 2. When the computer system is initially powered, the mode information is acquired into the control unit 18 and then stored in the indicator 12. The control unit 18 includes an instruction decoder. When the vector instruction controller 20 initiates the operation thereof, the controller 20 checks the content of the indicator in order to determine which mode should be taken for implementing vector operations.

Figure 2:
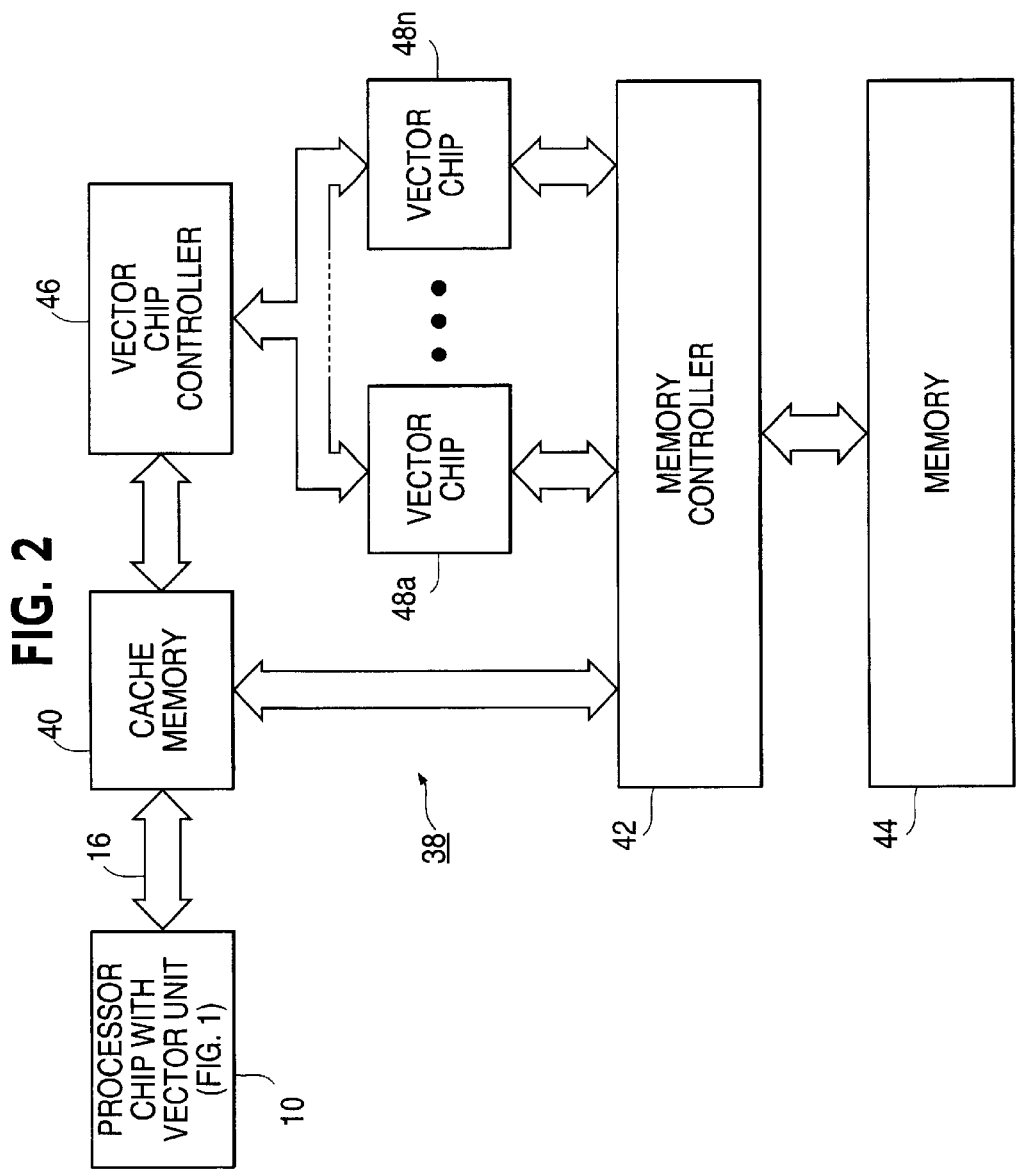
FIG. 2 is a block diagram schematically showing, in addition to the processor chip of FIG. 1, a plurality of functional blocks provided outside of the FIG. 1 chip.

Before further discussing the vector operations, reference is made to FIGS. 2 to 4.

FIG. 2 is a block diagram showing a hardware arrangement 38 provided outside the processor chip 10 of FIG. 1. The arrangement 38 comprises a cache memory 40, a memory controller 42, a memory 44 such as a RAM (random access memory), a vector chip controller 48, and a plurality of vector chips 48a–48n.

As mentioned above, when Mode 1 is selected, the vector operation is carried out within the processor chip 10, and thus, the vector chip controller 46 and vector chips 48a–48n are not used, the manner of which is shown in FIG. 3. In order to show that the blocks 46 and 48a–48n remain inactive, these blocks are indicated in phantom. In Mode 1, since the vector length is relatively short, a high cache hit rate can be expected.

On the other hand, when Mode 2 is selected, the vector operation is implemented only outside the processor chip 10. As referred to in the opening paragraphs, when the vector length ranges up to 256 (for example), it is no longer expected to attain a high hit rate. Therefore, as shown in FIG. 4, the cache memory 40 is not accessed (functionally bypassed). Although the cache memory 40 is not used in Mode 2, it is practically preferable to use the input/output pins of the cache 40 in both of Modes 1 and 2.

The above mentioned operation will further be described with reference to the flow chart of FIG. 5.

In FIG. 5, at step 60, a check is made to determine if a computer system including the processor chip 10 is initialized or initially powered. If the answer is negative, a loop including the step 60 is repeated. On the other hand, if the inquiry made at step 60 is positive (viz., yes), the routine proceeds to step 62 at which a check is made to determine if the vector data should be processed in Mode 1. If the answer at step 62 is yes then the routine goes to step 64 at which the vector data is processed using Mode 1, and otherwise, at step 66, the vector data is processed using Mode 2. In the above, the computer initialization is checked at step 60. However, in order to proceed to step 62, it is possible to make a check as to whether or not a new program is executed.

It will be understood that the above disclosure is representative of only one possible embodiment of the present invention and that the concept on which the invention is based is not specifically limited thereto.

What is claimed is:

1. A method of implementing vector operation using a processor chip which is provided with a vector unit, comprising the steps of:
   determining a vector operation mode, among first and second modes, via which the vector operation is implemented under control of said processor chip, said determination of the vector operation mode being carried out in said processor chip, wherein the vector operation mode is determined by vector lengths of vector data;
   implementing the vector operation using said vector unit provided in said processor chip if said vector operation mode is the first mode; and
   implementing the vector operation using a vector unit providing outside said processor chip if said vector operation mode is the second mode.

2. A method as claimed in claim 1, wherein the vector operation mode is determined when a computer system including said processor chip is initialized.

3. A method as claimed in claim 1, wherein the vector operation mode is determined when a new program is executed.

4. A method as claimed in claim 1, wherein when said first mode is selected, a cache memory, provided outside said processor chip, is accessed.

5. A method as claimed in claim 4, wherein when said second mode is selected, said cache is functionally bypassed in order to avoid cache miss.

6. A method as claimed in claim 4, wherein in said first mode, each vector data has a vector length which does not deteriorate a cache hit rate.

7. A method of implementing vector operation using a processor chip which is provided with a vector unit, comprising the steps of:
   determining a vector operation mode, among first and second modes, via which the vector operation is implemented under control of said processor chip, said determination of the vector operation mode being carried out in said processor chip when a computer system including said processor chip is initialized, wherein the vector operation mode is determined by vector lengths of vector data;
   implementing the vector operation using said vector unit provided in said processor chip if said vector operation mode is the first mode; and
   implementing the vector operation using a vector unit providing outside said processor chip if said vector operation mode is the second mode.

8. A method as claimed in claim 7, wherein when said first mode is selected, a cache memory, provided outside said processor chip, is accessed.

9. A method as claimed in claim 8, wherein when said second mode is selected, said cache is functionally bypassed in order to avoid cache miss.

10. A method as claimed in claim 8, wherein in said first mode, each vector data has a vector length which does not deteriorate a cache hit rate.

11. A method of implementing vector operation using a processor chip which is provided with a vector unit, comprising the steps of:
   determining a vector operation mode, among first and second modes, via which the vector operation is implemented under control of said processor chip, said determination of the vector operation mode being carried out in said processor chip when a new program is executed, wherein the vector operation mode is determined by vector lengths of vector data;
   implementing the vector operation using said vector unit provided in said processor chip if said vector operation mode is the first mode; and
   implementing the vector operation using a vector unit providing outside said processor chip if said vector operation mode is the second mode.

12. A method as claimed in claim 11, wherein when said first mode is selected, a cache memory, provided outside said processor chip, is accessed.

13. A method as claimed in claim 12, wherein when said second mode is selected, said cache is functionally bypassed in order to avoid cache miss.

14. A method as claimed in claim 12, wherein in said first mode, each vector data has a vector length which does not deteriorate a cache hit rate.

15. An apparatus for implementing a vector operation using a processor chip which includes a vector unit, comprising;
- a processor;
- an indicator circuit in said processor chip for storing a first or second vector operation mode, wherein the vector operation is implemented under control of said processor chip, said indication of the vector operation mode is determined in said processor chip;
- a cache memory coupled to the processor for storing an executable program having mode information;
- a vector chip controller coupled to the cache memory;
- a plurality of vector chips coupled to the vector chip controller;
- a memory controller coupled to the plurality of the vector chips and said cache memory; and
- a RAM coupled to the memory controller;
- wherein when the indicator circuit indicates that the first vector operation mode is selected, the vector operation is implemented inside said processor chip using said cache memory, said memory controller and said RAM.

16. The apparatus of claim 15, further comprising a control unit which determines the vector operation mode when a computer system including said processor chip is initialized and outputs the mode indication to the indicator circuit.

17. The apparatus of claim 15, wherein when the indicator circuit indicates that the second vector operation mode is selected, said vector operation is implemented outside said processor chip using said vector chip controller, said plurality of vector chips, said memory controller and said RAM.

* * * * *